United States Patent
Yamane et al.

(10) Patent No.: US 11,407,155 B2
(45) Date of Patent: Aug. 9, 2022

(54) FLUID FEEDING SYSTEM AND MOLDING SYSTEM

(71) Applicant: Heishin Ltd., Kobe (JP)

(72) Inventors: Tetsuo Yamane, Nagahama (JP);
Masaki Nakazawa, Nagahama (JP);
Atsushi Tanito, Nagahama (JP)

(73) Assignee: Heishin Ltd., Kobe (JP)

( * ) Notice: Subject to any disclaimer, the term of this patent is extended or adjusted under 35 U.S.C. 154(b) by 666 days.

(21) Appl. No.: 15/308,547

(22) PCT Filed: Apr. 28, 2015

(86) PCT No.: PCT/JP2015/062860
§ 371 (c)(1),
(2) Date: Nov. 2, 2016

(87) PCT Pub. No.: WO2015/166955
PCT Pub. Date: Nov. 15, 2015

(65) Prior Publication Data
US 2017/0050358 A1 Feb. 23, 2017

(30) Foreign Application Priority Data
May 2, 2014 (JP) .............................. JP2014-094968

(51) Int. Cl.
*B29C 45/18* (2006.01)
*B05B 7/32* (2006.01)
(Continued)

(52) U.S. Cl.
CPC .............. *B29C 45/18* (2013.01); *B05B 7/32* (2013.01); *B05B 9/0406* (2013.01);
(Continued)

(58) Field of Classification Search
CPC .................................. B29C 45/18; B05B 7/32
See application file for complete search history.

(56) References Cited

U.S. PATENT DOCUMENTS 1,419,843 A * 6/1922 Goodbar ............... B05B 3/0413
239/745
4,407,431 A * 10/1983 Hutter, III ............... B01F 3/088
141/107
(Continued)

FOREIGN PATENT DOCUMENTS

| CN | 1732073 A | 2/2006 |
|---|---|---|
| CN | 102917855 A | 2/2013 |

(Continued)

OTHER PUBLICATIONS

Godwin—http://extension.colostate.edu/docs/pubs/crops/04703.pdf (Year: 2013).*
(Continued)

*Primary Examiner* — Nicholas R Krasnow
(74) *Attorney, Agent, or Firm* — Masuvalley and Partners; Peter R. Martinez (57) ABSTRACT

The fluid feeding system includes a feed channel connected to the discharging device, a pump connected to the feed channel, a valve for blocking a flow of the fluid that flows toward the introduction chamber via the feed channel, and a control device for determining a pressure state on the pump side and carrying out an opening-and-closing control of the valve 70 based on the determination result. The control device carries out the opening-and-closing control in which the valve is made into an open state when the control device determines that a pressure P1 on the pump side reaches a pressure state exceeding a given pressure.

6 Claims, 6 Drawing Sheets

(51) Int. Cl.
*B29B 7/60* (2006.01)
*B29B 7/00* (2006.01)
*B29B 7/32* (2006.01)
*B05B 9/04* (2006.01)
*B29C 31/06* (2006.01)
*B29C 45/03* (2006.01)
*B29C 45/76* (2006.01)

(52) U.S. Cl.
CPC .......... *B05B 9/0413* (2013.01); *B05B 9/0416* (2013.01); *B29B 7/002* (2013.01); *B29B 7/325* (2013.01); *B29B 7/603* (2013.01); *B29C 31/06* (2013.01); *B29C 45/03* (2013.01); *B29C 45/76* (2013.01); *B29B 7/007* (2013.01)

(56) References Cited

U.S. PATENT DOCUMENTS

| | | | | |
|---|---|---|---|---|
| 4,989,756 | A * | 2/1991 | Kagamihara | B05C 11/1002 222/55 |
| 5,927,560 | A * | 7/1999 | Lewis | B05C 11/1034 222/263 |
| 7,144,532 | B2 | 12/2006 | Kim | |
| 9,347,858 | B2 * | 5/2016 | Tokumaru | G01N 35/1016 |
| 2002/0043539 | A1 * | 4/2002 | Pagel | B05C 5/0225 222/207 |
| 2003/0061811 | A1 * | 4/2003 | Mentink | E05F 15/49 60/476 |
| 2006/0139562 | A1 * | 6/2006 | Lee | G02F 1/1339 349/190 |
| 2007/0025879 | A1 * | 2/2007 | Vandergaw | G01N 35/1095 422/73 |
| 2008/0114290 | A1 * | 5/2008 | King | A61M 3/0283 604/30 |
| 2011/0048551 | A1 * | 3/2011 | Tanaka | G01F 25/0007 137/486 |
| 2013/0333672 | A1 * | 12/2013 | Ryoo | F02M 37/0041 123/506 |
| 2014/0263468 | A1 * | 9/2014 | Conner | B65D 83/0005 222/389 |
| 2016/0243573 | A1 * | 8/2016 | McGuffie | E01C 23/22 |

FOREIGN PATENT DOCUMENTS

| | | |
|---|---|---|
| JP | H07-184509 A | 7/1995 |
| JP | 08-131921 A | 5/1996 |
| JP | 2006-503739 A | 2/2006 |
| JP | 2011-161413 A | 8/2011 |
| JP | 2011-201066 A | 10/2011 |
| JP | 2011-245790 A | 12/2011 |
| JP | 2012-086444 A | 5/2012 |
| KR | 10-2013-0001472 A | 1/2013 |
| KR | 10-1240056 B1 | 3/2013 |

OTHER PUBLICATIONS

ISA/JP, International Search Report dated Jun. 30, 2015 in International Application No. PCT/JP2015/062860, total 4 pages including translation.

* cited by examiner

FLUID FEEDING SYSTEM AND MOLDING SYSTEM

This application is the U.S. National Phase of International Patent Application No. PCT/JP2015/062860, filed on Apr. 28, 2015, entitled "FLUID SUPPLY SYSTEM AND MOLDING SYSTEM," and claims priority under 35 U.S.C. § 119 to Japanese Patent Application No. 2014-094968, filed on May 2, 2014, which are hereby expressly incorporated by reference in their entirety for all purposes.

TECHNICAL FIELD

The present invention relates to a fluid introducing system for introducing fluid into a discharging device provided with an introduction chamber capable of introducing and discharging the fluid by a volumetric change, and also relates to a molding system provided with the fluid introducing system.

BACKGROUND ART

Conventionally, devices such as two-pack spraying devices one of which is disclosed in Patent Document 1: JP1995-185409A described below have been provided. The devices mix in an atomizing head a primary material fed from a primary material tank and a curing agent fed from a curing agent tank, and discharge the mixture. In the spraying device, in order to keep a mixture ratio constant regardless of an amount of discharge, and to prevent poor curing due to a variation in the mixture ratio, a rotational speed setting of a curing agent pump is possible manually, while a rotational speed of a primary material pump is feedback-controlled by a programmable controller so that the ratio of a primary material flow rate and a curing agent flow rate is maintained at a given blending ratio.

DISCLOSURE OF THE INVENTION

Problems to be Solved by the Invention

Here, the present inventors studied, instead of the atomizing head provided to the spraying device disclosed in Patent Document 1 described above, a device having a discharging device capable of feeding and discharging fluid by a volumetric change of an introduction chamber for introducing the fluid, and feedable of the fluid pumped by a pump into the introduction chamber. Specifically, the inventors examined a device which is capable of introducing the fluid into the introduction chamber by increasing a volume of the introduction chamber and then discharging the fluid by decreasing the volume of the introduction chamber.

As a result of the study, they found out that a large pressure fluctuation accompanying the volumetric change occurs in the discharging device, and a trouble accompanying the fluctuation occurs. Specifically, there is a possibility that an internal pressure of the introduction chamber drops rapidly when the volume of the introduction chamber is rapidly increased for introduction of the fluid, and the introduction chamber is communicated with a feed channel of the fluid connected to the introduction chamber. Even in such a state, the internal pressure of the introduction chamber can be recovered to some extent by feeding pressurized fluid from the pump. However, a problem that the internal pressure of the introduction chamber is low even when the fluid is fully introduced into the introduction chamber and, thus, a sufficient discharge pressure cannot be obtained, and a problem that the discharge pressure becomes unstable, may arise. Moreover, when the discharge pressure of the discharging device is insufficient or unstable, a poor discharge of the fluid occurs and, thus, a secondary problem accompanying the poor discharge may also arise. Specifically, when the fluid discharged from the discharging device is used in order to mold an object in a molding machine, there is a problem of poor molding occurring or the like if the poor discharge described above occurs.

Thus, the present invention is to provide a fluid feeding system which can feed fluid so that an internal pressure fluctuation of a discharging device is minimized to minimize a poor discharge of the fluid, and to provide a molding system provided with the fluid feeding system.

Summary of the Invention

In order to solve the problems described above, according to one aspect of the present invention, a fluid feeding system for feeding fluid to a discharging device that is capable of introducing and discharging the fluid based on a pressure difference is provided. The fluid feeding system includes a feed channel connected to the discharging device, a pump connected to the feed channel, a valve for blocking a flow of the fluid that flows toward the discharging device via the feed channel, and a control device for determining a pressure state on the pump side and carrying out an opening-and-closing control of the valve based on the determination result. The control device carries out the opening-and-closing control in which the valve is made into an open state when the control device determines that one or both of a pressure P1 on the pump side and a pressure P2 on the discharging device side reaches a pressure state exceeding a given pressure.

In the fluid feeding system according to the aspect of the present invention, the valve is kept in a closed state until it is determined that the pressure P1 on the pump side exceeds at least the given pressure, and the valve is then made into the open state after it is determined that the pressure P1 exceeds the given pressure. Thus, even if the valve is made into the open state so as to introduce the fluid, the fluid is introduced to the discharging device under a high pressure state exceeding the given pressure, and a significant drop of an internal pressure of the discharging device can be reduced. Therefore, according to the aspect of the present invention, the fluid feeding system with which an internal pressure fluctuation of the discharging device can be minimized to minimize a poor discharge of the fluid can be provided.

In the above described fluid feeding system, it is preferred that the discharging device includes an introduction chamber into which the fluid is introducible, and a fluid drawing-in mechanism for producing the pressure difference by changing a volume of the introduction chamber to draw the fluid into the introduction chamber, and the fluid introduced into the introduction chamber is dischargeable to outside by decreasing the volume of the introduction chamber, and the fluid is introducible into the introduction chamber by increasing the volume of the introduction chamber after the discharge of the fluid.

Also with such a structure, the internal pressure fluctuation of the introduction chamber of the discharging device can be minimized to minimize the poor discharge of the fluid.

Here, when the introduction of the fluid to the discharging device completes, it is considered as general to stop the pump provided for pumping the fluid as it is almost simultaneous with bringing the valve into the closed state. However, if the pump is stopped almost simultaneous with closing the valve, a large pressure difference may be produced between the pump side and the discharging device side. Specifically, the large pressure difference therebetween may be produced such that the pump side becomes high in pressure and the discharging device side becomes low in pressure. When such a pressure difference is produced, a phenomenon, so-called pressure-balance effect occurs, and the pressure P2 on the discharging device side may rise affected by the pressure P1 on the pump side with the high pressure. Further, such a phenomenon may bring that the pressure state of the fluid when being introduced to the discharging device is higher than expected. Therefore, when the introduction of the fluid to the discharging device completes, it is preferable to reduce the pressure on the pump side to bring it closer to the pressure on the discharging device side, and make a situation where the pressure-balance effect hardly occurs.

In the fluid feeding system according to the aspect of the present invention provided based on the above described knowledge, the pump may be switchable of a direction of the fluid flow between a positive direction and a negative direction. The control device may carry out a final stage control in which the pump is operated so that the direction of the fluid flow is switched to a reversed direction from a direction when the fluid is discharged, in a feed final stage where the introduction of the fluid to the discharging device is terminated.

In the fluid feeding system according to the aspect of the present invention, the pump switchable of the direction of the fluid flow between the positive direction and the negative direction is adopted. Thus, in the feed final stage where the introduction of the fluid to the discharging device is completed, since the pump is operated so that the direction of the fluid flow is switched to the reversed direction from the direction when the fluid is discharged, the pressure on the pump side is reduced to be closer to the pressure on the discharging device side. Therefore, it can be made a situation where the pressure-balance effect hardly occurs and a possibility of the pressure P2 on the discharging device side being higher than expected can be minimized.

Here, if the final stage control described above is continued until the pressure P1 on the pump side becomes below the pressure P2 on the discharging device side, the problem of a backward flow of the fluid from the discharging device side to the pump side may arise.

Therefore, so as to suppress the above described problem, in the fluid feeding system according to the aspect of the present invention described above, the final stage control is preferably terminated within a range where the pressure P1 on the pump side is above the pressure P2 on the discharging device side.

With such a configuration, the backward flow of the fluid to the pump side from the discharging device side accompanying the final state control is preventable.

In the fluid feeding system according to the aspect of the present invention described above, the feed channel may be branched to a plurality of branched channels upstream of the valve in a feeding direction of the fluid to the discharging device. The pump may be provided to each of the branched channels.

According to such a structure, the fluid can be fed to the discharging device via the plurality of feed channels.

In the fluid feeding system according to the aspect of the present invention described above, the fluid fed via one or more of the plurality of branched channels and the fluid fed via other one or more branched channels may have properties that change into a different property by mixing the fluids.

In the fluid feeding system according to the aspect of the present invention described above, the control device may carry out a feedback control of an output of the pump so that the pressure P2 on the discharging device side falls within a pressure range defined by a given maximum pressure and minimum pressure, after the valve is made into the open state and the introduction of the fluid to the discharging device is started. If the pressure P2 shows a tendency to rise, the control device may carry out an output control of the pump when the pressure P2 exceeds the maximum pressure. If the pressure P2 shows a tendency to drop, the control device may carry out the output control of the pump when the pressure P2 becomes below the minimum pressure, or when the pressure P2 is changed to the tendency to rise from the tendency to drop.

According to such a configuration, the pressure P2 on the discharging device side in the introduction process of the fluid toward the discharging device can be stabilized.

Further a molding system according to another aspect of the present invention includes a molding machine, having the discharging device, and capable of molding a molded object by using fluid discharged from the discharging device, and the fluid feeding system of the aspect of the present invention described above.

Since the molding system of the other aspect of the present invention includes the fluid feeding system of the aspect of the present invention described above, the poor discharge of the fluid hardly occurs. Therefore, according to the molding system of the other aspect of the present invention, the molded object can be molded accurately.

Effects of the Invention

According to the aspects of the present invention, a fluid feeding system which can feed fluid so that an internal pressure fluctuation of a discharging device is minimized to minimize a poor discharge of the fluid, and a molding system provided with the fluid feeding system can be provided.

MODES FOR CARRYING OUT THE INVENTION

Figure 1:
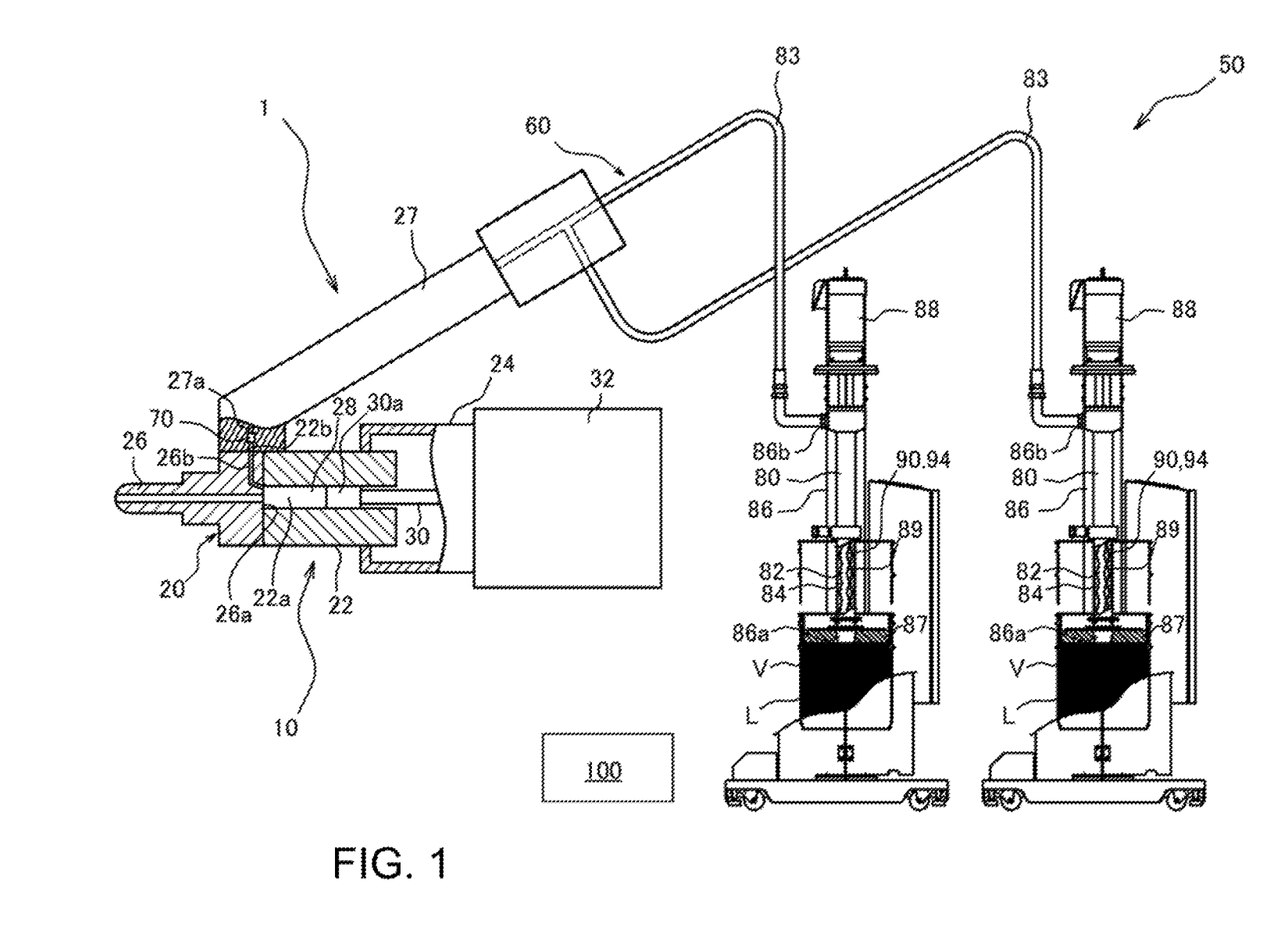
FIG. 1 is a device configuration view illustrating a device configuration of a molding system and a fluid feeding system according to one embodiment of the present invention.
Figure 2:
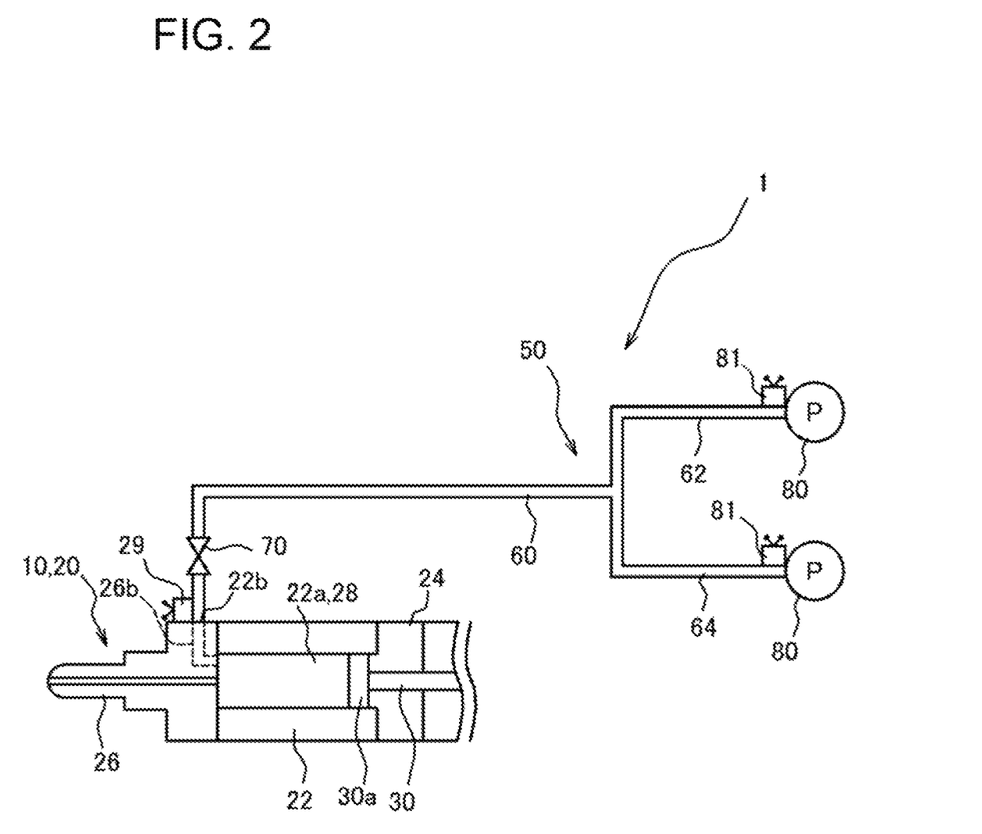
FIG. 2 is a channel configuration view schematically illustrating a configuration of a feed channel which is adopted to the molding system and the fluid feeding system which are illustrated in FIG. 1.

Hereinafter, a molding system 1 and a fluid feeding system 50 used for the molding system 1, according to one embodiment of the present invention, are described in detail with reference to the accompanying drawings. As illustrated in FIGS. 1 and 2, the molding system 1 is comprised of a molding device 10 and the fluid feeding system 50. In the molding system 1, the fluid feeding system 50 pumps fluid that serves as raw material to feed the fluid to the molding device 10, and discharges the fluid into the molding device 10 to be able to mold the fluid into a desired shape.

The molding device 10 is provided with a discharging device 20 for discharging (injecting) the fluid fed from the fluid feeding system 50. The molding device 10 is capable of manufacturing a molded object having any shape by feeding and discharging plural types of fluids (two types in this embodiment) to the discharging device 20. In this embodiment, a first fluid and a second fluid are fed by the fluid feeding system 50 as the molding materials. The first fluid and the second fluid have a characteristic of changing by being mixed to different property from their properties prior to mixing the fluids. Specifically, the first fluid and the second fluid have a characteristic of being cured when they are mixed.

The discharging device 20 is provided with a cylinder 22, a fluid drawing-in mechanism 24, a nozzle 26, and a mixer mechanism 27, and is a device which is capable of discharging (injecting) the fluid which is fed to the cylinder 22 from the nozzle 26 by actuating the fluid drawing-in mechanism 24. Specifically, a cylinder bore 22a is formed in the cylinder 22 so as to penetrate the cylinder 22 in axial directions. The cylinder 22 has an introduction chamber 28 formed by the cylinder bore 22a.

The introduction chamber 28 is a space defined by an end face 26a of the nozzle 26 connected to one-end side (tip-end side) of the cylinder 22, and a piston rod 30 provided to the fluid drawing-in mechanism 24 which is provided to the other-end side of the cylinder 22. The introduction chamber 28 is capable of introducing the fluid via internal passages 26b and 27a formed inside the nozzle 26 and the mixer part 27 connected to the cylinder 22, respectively.

The mixer part 27 is a part having a function to mix the plural kinds of fluids fed from the fluid feeding system 50 described in detail later, and is connected to the cylinder 22. A mixing mechanism, such as a static mixer (not illustrated), is provided inside the mixer part 27 to be able to mix the fluids fed from the fluid feeding system 50 side and feed the mixture to the cylinder 22 side. The internal passage 27a described above and a valve 70 which is capable of blocking a flow of the fluid via the internal passage 27a are formed inside the mixer part 27. The internal passage 27a communicates with the internal passage 26b formed in the nozzle 26 at one-end side, and communicates with the mixing mechanism (not illustrated) at the other-end side. Thus, the fluids fed from the fluid feeding system 50 side can be mixed in the mixer part 27, and can be introduced into the introduction chamber 28.

The fluid drawing-in mechanism 24 is a mechanism for changing the volume of the introduction chamber 28. Specifically, the fluid drawing-in mechanism 24 is comprised of the piston rod 30 and a drive unit 32. The piston rod 30 is a shaft body inserted into the cylinder bore 22a which serves as the introduction chamber 28 so as to reciprocate in the axial directions of the cylinder 22. A head part 30a provided to the tip-end side of the piston rod 30 has a substantially the same shape and substantially the same cross-sectional area as the opening shape and the opening cross-sectional area of the cylinder bore 22a which serves as the introduction chamber 28. Thus, the volume of the introduction chamber 28 formed inside the cylinder 22 can be changed by actuating the drive unit 32 to reciprocate the piston rod 30. Therefore, the volume of the introduction chamber 28 can be decreased and the fluid can be discharged from the nozzle 26 by moving the piston rod 30 to the nozzle 26 side in a state where the fluid is introduced (filled) into the introduction chamber 28. On the other hand, the volume of the introduction chamber 28 can be increased by moving the piston rod 30 in the separating direction from the nozzle 26 and, thus, it becomes in a state where the fluid can be introduced from the fluid feeding system 50 side.

The fluid feeding system 50 includes a feed channel 60, a valve 70 (valve), pumps 80, and a control device 100. The feed channel 60 is a channel formed in order to feed the fluids to the discharging device 20. The feed channel 60 is connected via the valve 70 to a connecting port 22b provided to the cylinder 22. Thus, the flow of the fluids which flow toward the introduction chamber 28 via the feed channel 60 can be controlled by opening and closing the valve 70.

The feed channel 60 is branched to a plurality of lines at a location upstream of the position where the valve 70 is provided with respect to the feeding direction of the fluid, and the pump 80 is provided to each line. In this embodiment, a line of the feed channel 60 which connects the components covering from the pumps 80 to the introduction chamber 28 is formed not only by pipings 83 connected to the pumps 80 but also by the internal passages 26b and 27a via which the fluid is able to flow inside the nozzle 26 and the mixer part 27, the mixing mechanism (not illustrated), etc. The feed channel 60 is branched at a location upstream of the valve 70 to two lines, a first branched channel 62 and a second branched channel 64. The first branched channel 62 is a branched channel for feeding the first fluid used as a primary material, and the second branched channel 64 is a branched channel for feeding the second fluid used as a sub material. Moreover, the pump 80 is provided to the first branched channel 62 and the second branched channel 64, respectively.

Figure 3:
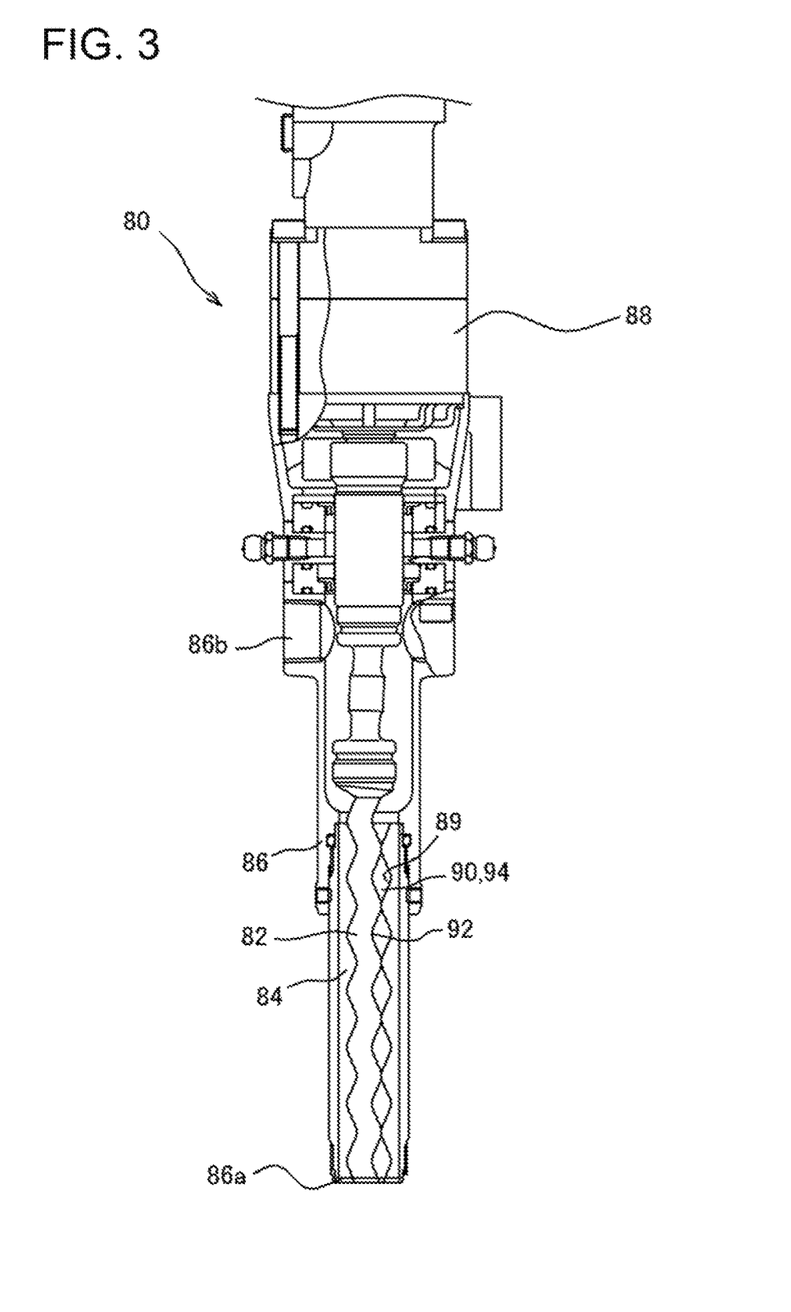
FIG. 3 is a cross-sectional view of a pump adopted to the fluid feeding system illustrated in FIG. 1.

The pump 80 is comprised of a so-called rotary displacement pump, and it is capable of changing the flow direction of the fluid between positive direction and the negative direction. In this embodiment, a uniaxial eccentric screw pump is adopted as the pump 80. Specifically, as illustrated in FIG. 3, the pump 80 has an externally-threaded rotor 82 which eccentrically rotates by receiving a driving force, and a stator 84 of which an inner circumferential surface is formed into an internal thread. The pump 80 is structured such that the rotor 82 and the stator 84 are accommodated inside a pump casing 86. The pump casing 86 is a cylindrical member made of metal, and has an opening which functions as an introducing port 86a at one-end side in longitudinal directions of the pump casing 86. Moreover, an opening which functions as a discharging port 86b is formed in an intermediate portion of the pump casing 86 in the longitudinal directions. The discharging port 86b is plumbed to a feeding source (not illustrated) of the fluid.

By rotating the rotor 82 in the positive direction, the pump 80 can suck from the introducing port 86a the fluid which is an object to be pumped, and can discharge the fluid from the discharging port 86b. On the other hand, by rotating the rotor 82 in the negative direction, the flow direction of the fluid can be reversed from a case where the rotor 82 is rotated in the positive direction. The stator 84 is a member having a substantially circular cylindrical contour which is made of material, such as rubber, or plastic. An inner circumference wall 89 of the stator 84 is formed in a single-twist or multiple-twist female screw shape with n-grooves. In this embodiment, the stator 84 is formed in a multiple twist female screw with two grooves. A penetration bore 90 of the stator 84 is formed in a substantially elongated circle or oval in the cross-sectional shape thereof (aperture shape) even if it is cut at any position in longitudinal directions of the stator 84.

The rotor 82 is a shaft body made of material, such as metal, plastic or ceramic, and is formed in a single-twist or multiple-twist male screw shape with n−1 grooves. In this embodiment, the rotor 82 is formed in an eccentric male screw with one groove. The rotor 82 is formed in a substantially true circle in the cross-sectional shape thereof even if it is cut at any position in the longitudinal directions. The rotor 82 is inserted into the penetration bore 90 formed in the stator 84 described above, and is freely eccentrically rotatable inside the penetration bore 90. An end part of the rotor 82 on the base end side (discharging port 86b side) is connected via a universal coupling etc. to a motor 88 which is a source of driving force. Thus, the rotor 82 rotates by receiving the driving force from the motor 88.

When the rotor 82 is inserted into the stator 84, an outer circumference wall 92 of the rotor 82 and the inner circumference wall 89 of the stator 84 become in a state where they closely contact with each other at tangent lines thereof, and a fluid conveying channel 94 (cavity) is formed between the inner circumference wall 89 of the stator 84 and the outer circumference wall 92 of the rotor 82. The fluid conveying channel 94 is formed so as to extend spirally in the longitudinal direction of the stator 84 and the rotor 82.

As the rotor 82 is rotated inside the penetration bore 90 of the stator 84, the fluid conveying channel 94 moves in the longitudinal direction of the stator 84, while rotating inside the stator 84. Thus, when the rotor 82 is rotated, the fluid which is the object to be pumped can be sucked into the fluid conveying channel 94 from the introducing port 86a side, and the fluid can be conveyed toward the other-end side of the stator 84 in a state where the fluid is constrained inside the fluid conveying channel 94, and can be discharged to the other-end side (discharging port 86b side) of the stator 84.

As illustrated in FIG. 1, the pump 80 is made in a state where it stands vertically while the introducing port 86a being oriented downwardly, and is inserted into a container V which accommodates the fluid. A follow plate 87 is attached to an end of the pump 80 on the introducing port 86a side. The follow plate 87 is placed along the surface of the fluid inside the container V. Moreover, the container V is able to be raised and lowered with respect to the pump 80 by a driving unit (not illustrated). Thus, by raising the container V with respect to the pump 80 in an interlocking manner with a fall of the fluid surface, the introducing port 86a is moved toward the bottom side of the container V while the fluid is scraped by the follow plate 87 toward the bottom side of the container V. Therefore, even if the fluid has high viscosity, it can be sucked certainly from the introducing port 86a.

The control device 100 is capable of carrying out a control of feeding the fluid to the discharging device 20 by the fluid feeding system 50, in accordance with a feeding stage of the fluid. That is, the control device 100 carries out the feed control in which the fluid is fed to the introduction chamber 28 by dividing roughly into three stages of a feed initial stage, a feed middle stage, and a feed final stage. In the feed initial stage, a control in which the pumps 80 are actuated prior to the valve 70 being made into an open state is carried out. Thus, a significant fluctuation of a pressure P2 on the introduction chamber 28 side can be reduced when the valve 70 is made into the open state (refer to Steps 1 to 4 in FIG. 4). Further in the feed middle stage, a control for stabilizing the pressure P2 on the introduction chamber 28 side within a range between a given maximum pressure Po and minimum pressure Pu is carried out (refer to Steps 5 to 11 in FIG. 4). Moreover, in the feed final stage, a control for bringing a pressure P1 on the pump 80 side closer to the pressure P2 on the introduction chamber 28 side after the completion of the fluid introduction into the introduction chamber 28 is carried out (Steps 12 to 17 in FIG. 4). Below, the feed control carried out by the control device 100 is described in detail based on a flowchart illustrated in FIG. 4 with reference to a graph which illustrates the pressure fluctuations illustrated in FIG. 5.

(Step 1)

Figure 4:
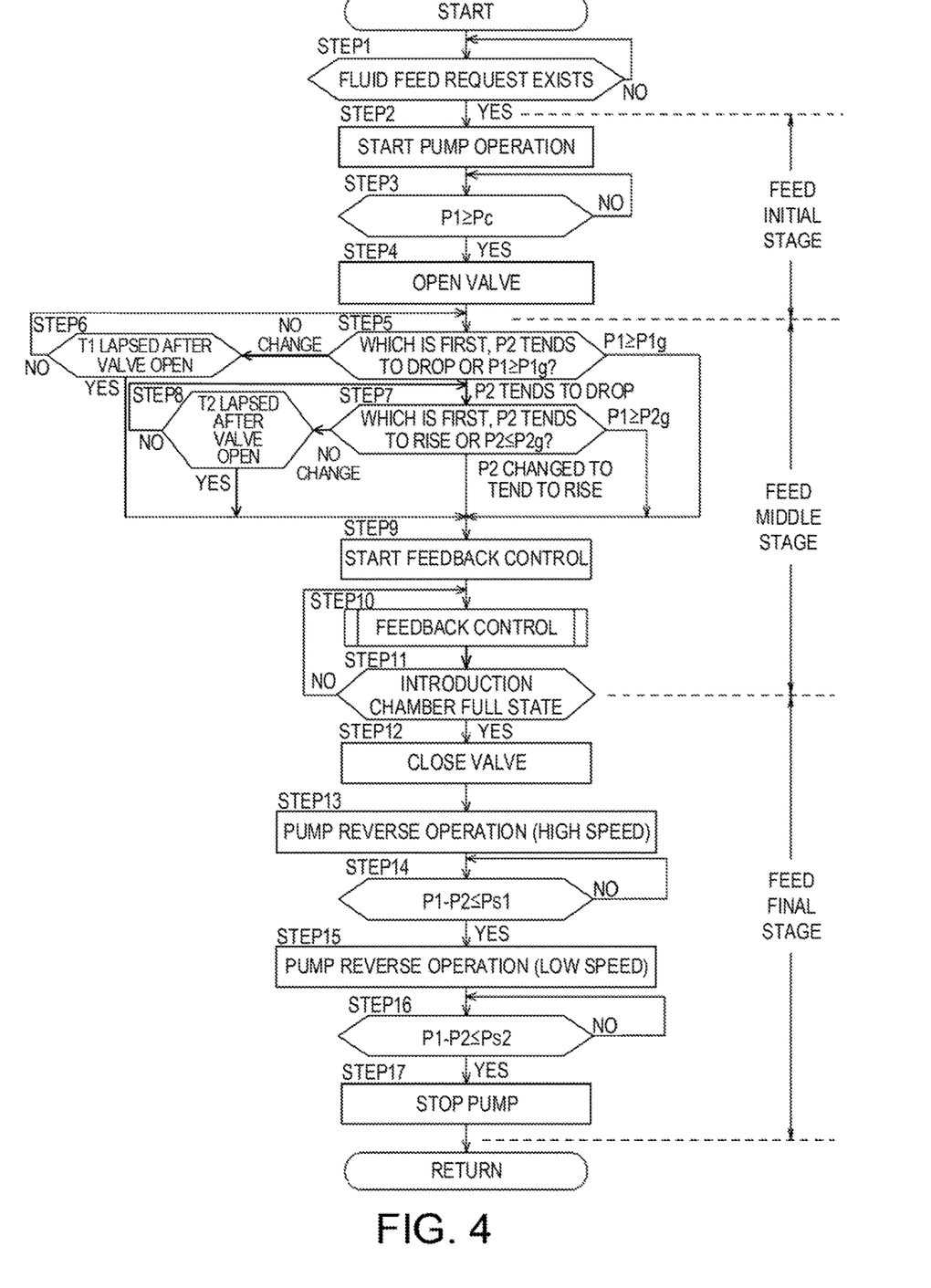
FIG. 4 is a flowchart illustrating one example of operation of the molding system illustrated in FIG. 1.

At Step 1, the control device 100 determines whether it is a timing of introducing the fluid into the introduction chamber 28. Here, the determination of whether it is the timing of introducing the fluid into the introduction chamber 28 can be carried out by various methods. Here, if it is confirmed that it is the timing of introducing the fluid, the control flow transits to Step 2.

(Step 2)

Figure 5:
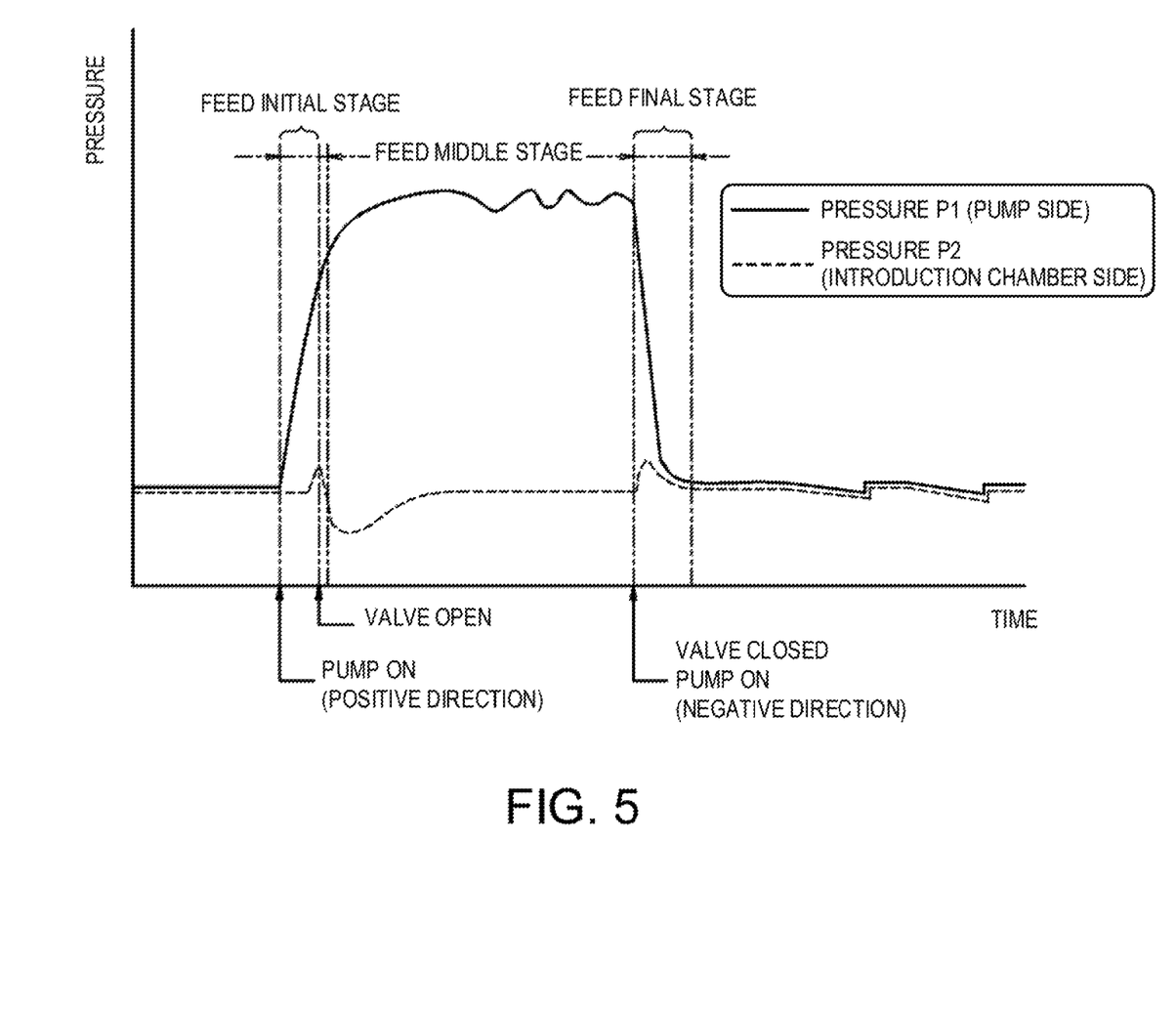
FIG. 5 is a graph schematically illustrating a situation of pressure fluctuations of a pump-side pressure and an introduction-chamber-side pressure in the molding system illustrated in FIG. 1.

At Step 2, the control device 100 starts pumping of the fluids by each pump 80 which is provided to the first branched channel 62 and the second branched channel 64, respectively. That is, at Step 2, each pump 80 starts to operate in the positive direction. Thus, as illustrated in FIG. 5, the pressure P1 on the pump 80 side starts to rise. That is, a difference between the pressure P1 and the pressure P2 on the introduction chamber 28 side increases. Then, the control flow transits to Step 3.

(Step 3)

At Step 3, the control device 100 determines whether the pressure P1 on the pump 80 side reaches a pressure state above a given valve-opening pressure Pc. Here, the determination at Step 3 can be carried out by various methods, in addition to the method of determining whether the pressure P1 becomes above the valve-opening pressure Pc by using detection signals from sensors 81 (refer to FIG. 2) which are actually and respectively provided to the pumps 80 side. Specifically, a timer which measures a period of time from a timing at which the pumps 80 are actuated at Step 2 may be provided. A determination of the pressure P1 reaching the pressure state above the valve-opening pressure Pc may be made by an estimation of based on a condition where the period of time measured by the timer (a post valve-opening lapsed time "to") reaches a given period of time. In this embodiment, the control device 100 determines that the pressure P1 reaches the pressure state above the given valve-opening pressure Pc when the post valve-opening lapsed time "to" reaches the given time, and the control flow then transits to Step 4.

(Step 4)

At Step 4, the valve 70 is switched from a closed state to the open state. At this timing, the volume increase-and-decrease mechanism 24 operates to move the piston rod 30 backward and, thus, the volume of the introduction chamber 28 increases. By the thus-caused pressure difference, an introduction of the first fluid and the second fluid into the introduction chamber 28 is started via the first branched channel 62 and the second branched channel 64, respectively. Here, in the stage where the valve 70 is switched to the open state, the pressure P1 on the pump 80 side has already reached the pressure state above the given valve-opening pressure Pc. Thus, a drop of the pressure P2 is not so large even immediately after the valve 70 is switched to the open state. As described above, when the valve 70 is made into the open state, the control flow in the feed initial stage is finished, and the control flow transits to the feed middle stage from Step 5.
(Step 5)

At Step 5, the control device 100 determines which condition is first achieved: (condition 5-1) the pressure P2 on the introduction chamber 28 side shows a tendency to drop; and (condition 5-2) the pressure P1 on the pump 80 side becomes above a target pressure P1g which is to be at least maintained by the pressure P1. Here, if none of (condition 5-1) and (condition 5-2) is changed, the control flow transits to Step 6. Moreover, if the change of (condition 5-1) first occurs, the control flow transits to Step 7. On the other hand, if the change of (condition 5-2) first occurs, the control flow transits to Step 9 where a feedback control is started in order to reduce rotational speeds of the pumps 80.
(Step 6)

At Step 6, the determination of whether a given time T1 has lapsed after the valve 70 becomes in the open state at Step 4 is made. If the given time T1 has not lapsed, the control flow returns to Step 5, and if the given time T1 has lapsed, the control flow transits to Step 9. That is, if none of (condition 5-1) and (condition 5-2) is changed at Step 5, the feedback control is started at Step 9 after the given time T1 lapses at Step 6.
(Step 7)

At Step 7, the control device 100 determines which condition is first achieved: (condition 7-1) the pressure P2 on the introduction chamber 28 side shows a tendency to rise; and (condition 7-2) the pressure P2 becomes below a given target pressure P2g. Here, if none of (condition 7-1) and (condition 7-2) is changed, the control flow transits to Step 8. If the change of (condition 7-1) first occurs, the control flow transits to Step 9 where the feedback control is carried out. Meanwhile, if the change of (condition 7-2) first occurs, the control flow transits to Step 9 where the feedback control is carried out in order to increase the rotational speeds of the pumps 80.
(Step 8)

At Step 8, the control device 100 determines whether a given time T2 has lapsed after the valve 70 becomes in the open state at Step 4. During the period where the given time T2 has not lapsed, the control flow returns to Step 7. On the other hand, if the given time T2 has lapsed, the control flow transits to Step 9. That is, if none of (condition 7-1) and (condition 7-2) is changed at Step 7, the feedback control is started at Step 9 after the given time T2 lapses at Step 8.
(Step 9)

The feedback control is started at Step 9. That is, the feedback control of the outputs of the pumps 80 is started in order to maintain the pressure P2 within a range of below the maximum pressure Po and above the minimum pressure Pu.
(Step 10)

At Step 10, the feedback control started at Step 9 is carried out. Although any kind of methods for the feedback control may be carried out, a PID control is adopted in this embodiment.
(Step 11)

At Step 11, the control device 100 determines whether the fluid is introduced into the introduction chamber 28 for more than a given quantity (a full state). If the introduction chamber 28 is in the full state, the control flow transits to Step 12. Thus, the feed control of the fluid transits to the feed final stage. On the other hand, if the introduction chamber 28 is not in the full state, the control flow returns to Step 5. Thus, the feed control of the fluid in the feed middle stage is continued. Note that, as for the determination of whether the introduction chamber 28 is in the full state, a method of directly or indirectly detecting the introduced amount of the fluid may be adopted, such as detecting that the piston rod 30 moves backward to a given position, directly detecting the introduced amount of the fluid, and detecting an unfilled space in the introduction chamber 28. Alternatively, a method of determining by an estimation of the introduced amount into the introduction chamber 28 based on a period of time from the start of introduction of the fluid may also be adopted, for example.
(Step 12)

If the control flow transits to Step 12, the valve 70 is changed from the open state to the closed state. Thus, the flow of the fluid which flows from the pump 80 side to the introduction chamber 28 is blocked so that the introduction of the fluid into the introduction chamber 28 is terminated. Then, the control flow transits to Step 13.
(Step 13)

At Step 13, the operating direction of the pumps 80 is reversed. That is, the rotating direction of the rotors 82 of the respective pumps 80 is reversed. Thus, as illustrated in FIG. 5, the internal pressure of the feed channel 60 in a range toward the pump 80 side with respect to the valve 70 shows the tendency to drop so that it approaches the internal pressure of the feed channel 60 in a range on the introduction chamber 28 side.
(Step 14)

At Step 14, a determination of whether a pressure difference Pd between the pressure P1 on the pump 80 side and the pressure P2 on the introduction chamber 28 side (Pd=P1−P2) reaches a state of being below a given first standard pressure difference Ps1 is made. The determination of whether the pressure difference Pd reaches the state of being below the first standard pressure difference Ps1 (0<Pd≤Ps1) may be carried out by various methods, in addition to the method of determining based on pressure values actually measured by the pressure sensors 81 actually provided to the pumps 80 side and a pressure sensor 29 provided to the introduction chamber 28 side. Specifically, a timer which measures a period of time from a timing at which the pumps 80 starts the operation in the negative direction at Step 13 may be provided. A determination may be made by an estimation that the pressure difference Pd reaches the state of being below the first standard pressure difference Ps1 when the time measured by the timer (a post reverse-start lapsed time tb) reaches a given period of time. If it is determined that the pressure difference Pd is in a state of being below the first standard pressure difference Ps1, the control flow transits to Step 15.
(Step 15)

At Step 15, a control in which the speed of the reverse operation of the pumps 80 started at Step 13 is reduced is carried out. That is, the rotating speed of the rotors 82 of the respective pumps 80 in the negative direction is reduced below the rotating speed up to Step 14 after the start at Step 13. The reason for reducing the rotating speed of the rotors 82 in the negative direction from this step is as follows.

That is, as the rotors 82 of the pumps 80 are actuated in the negative direction at Step 13, the pressure difference Pd between the pressure P1 and the pressure P2 on the introduction chamber 28 side reduces gradually. In order to reduce the pressure difference Pd smoothly, it may be desirable to operate the rotors 82 in the negative direction as fast as possible within a speed range which does not affect the operation. However, as a result of the present inventors' diligent study, they found out that the pressure difference Pd which had shown the tendency to drop till then might be changed back into the tendency to rise when the rotors 82 are stopped suddenly. Therefore, in this embodiment, the rotating speed of the rotors 82 in the negative direction is reduced at Step 15 in order to prevent the change of the pressure difference Pd into the tendency to rise.

(Step 16)

At Step 16, a determination of whether the pressure difference Pd between the pressure P1 on the pump 80 side and the pressure P2 on the introduction chamber 28 side (Pd=P1−P2) reaches a state of being below a given second standard pressure difference Ps2 is made. The second standard pressure difference Ps2 is lower than the first standard pressure difference Ps1 (0≤Ps2<Ps1). Therefore, at Step 16, a determination of whether the pressure difference Pd is smaller than that in the stage of Step 14, i.e., the pressure P1 is dropped to a state which is closer to the pressure P2, is made.

The determination of the pressure difference Pd at this step may be carried out by various methods, similar to the determination method at Step 14 described above. That is, a method of determining based on pressure values actually measured by the pressure sensors 81 actually provided to the pump 80 side and the pressure sensor 29 provided to the introduction chamber 28 side may be adopted. Alternatively, a timer which measures a period of time from a suitable timing, such as a timing at which the pumps 80 start the operation in the negative direction at Step 13 may be provided. An estimation of the pressure difference Pd having reached below the second standard pressure difference Ps2 when the period of time measured by the timer reaches a given time may be made, and a the determination may be made based on the estimated result. The control flow transits to Step 17 when the determination of the pressure difference Pd being below the second standard pressure difference Ps2 is made.

(Step 17)

If the pressure difference Pd reaches below the second standard pressure difference Ps2 at Step 16 described above, the pumps 80 are stopped. Here, the second standard pressure difference Ps2 is set to a pressure value which is assumed to have a low possibility that the pressure difference Pd having shown the tendency to drop till then will change back into the tendency to rise even when the pumps 80 (rotors 82) are stopped suddenly. Thus, even when the pumps 80 are stopped at Step 17, the possibility that the pressure difference Pd will change into the tendency to rise is low. When the pumps 80 are stopped at Step 17, a line of control flow is finished.

As described above, in the molding system 1 and the fluid feeding system 50, the valve 70 is kept in the closed state until the pressure P1 on the pump 80 side exceeds at least a given pressure, and the valve 70 is then made into the open state after the pressure P1 exceeds the valve-opening pressure Pc. Thus, even if the valve 70 is made into the open state in a state where the volume of the introduction chamber 28 is increased by moving the piston rod 30 back into the fluid drawing-in mechanism 24 side, the significant drop of the internal pressure of the introduction chamber 28 can be reduced. Therefore, the internal pressure fluctuation of the introduction chamber 28 in the feed initial stage can be minimized by having the configuration and performing the motion control which are described above.

Moreover, in this embodiment, the feedback control for stabilizing the pressure P2 on the introduction chamber 28 side within a range between the given maximum pressure Po and minimum pressure Pu is carried out in the feed middle stage. Thus, according to the configuration and control described above, the pressure P2 on the introduction chamber 28 side in the introduction process of the fluid into the introduction chamber 28 can be stabilized.

Furthermore, in this embodiment, the control in which the operating direction of the pumps 80 is reversed (final stage control) is carried out in the feed final stage. Thus, in the feed final stage, the pressure P1 on the pump 80 side can be reduced to bring it closer to the pressure P2 on the introduction chamber 28 side, and the rise of the pressure P2 caused by a pressure-balance effect can be reduced. Moreover, since the final stage control is terminated within a range where the pressure P1 on the pump 80 side is above the pressure P2 on the introduction chamber 28 side, an accidental backward flow of the fluid from the introduction chamber 28 side to the pump 80 side can be reduced. Especially, if fluid having a characteristic of changing by mixing to a different property from the property prior to mixing, similar to the first fluid and the second fluid which are used for molding in this embodiment, the systems may be desirable to have a configuration in which the backward flow of the fluid to the pump 80 side is preventable.

As described above, the fluid feeding system 50 can suitably be used for the fluid fed via the first branched channel 62 and the fluid fed via the second branched channel 64 which have a characteristic of being cured by mixing the fluids. The fluid feeding system 50 can suitably be used also when fluids which change to a different property from their original properties, such as reduce in quality by mixing, are adopted as the fluids. Note that the fluids used in the fluid feeding system 50 may not change to the different property from their original property by mixing the fluids.

Although in the fluid feeding system 50 of this embodiment, the configuration in which the feed channel 60 is branched to the first branched channel 62 and the second branched channel 64 upstream of the valve 70 in the feeding direction of the fluid to the discharging device 20, and the pump 80 is provided to each channel is illustrated, the present invention is not limited to this structure. Specifically, the feed channel 60 may be constructed by a single channel, without being branched. Alternatively, the feed channel 60 may be branched to a plurality of (three or more) branched channels. Moreover, also when the feed channel 60 is branched to many branched channels, it may be desirable to provide the pump 80 to each branched channel; however, if there is no operational problem when the pumps 80 are omitted from some of the branched channels, it may be configured to omit the pumps 80.

Although in this embodiment, the example in which the fluid feeding system 50 is applied to the molding system 1 is illustrated, the present invention is not limited to this structure. That is, the fluid feeding system 50 may be used independently or alone, or it may also be used in order to feed fluid in devices etc. other than the molding system 1.

Although the molding system 1 described above adopts the molding device 10 capable of extruding the fluid by an action of the cylinder 22, the present invention is not limited to this structure. Specifically, like a molding system 101 illustrated in FIG. 6, a molding device 110 provided with a discharging device 120 comprised of a uniaxial eccentric screw pump may also be adopted instead of molding device 10. Below, the molding device 101 is described. Note that detailed description of a configuration similar to the molding system 1 described above is omitted and, thus, the configuration is described by assigning the same reference numerals thereto.

Figure 6:
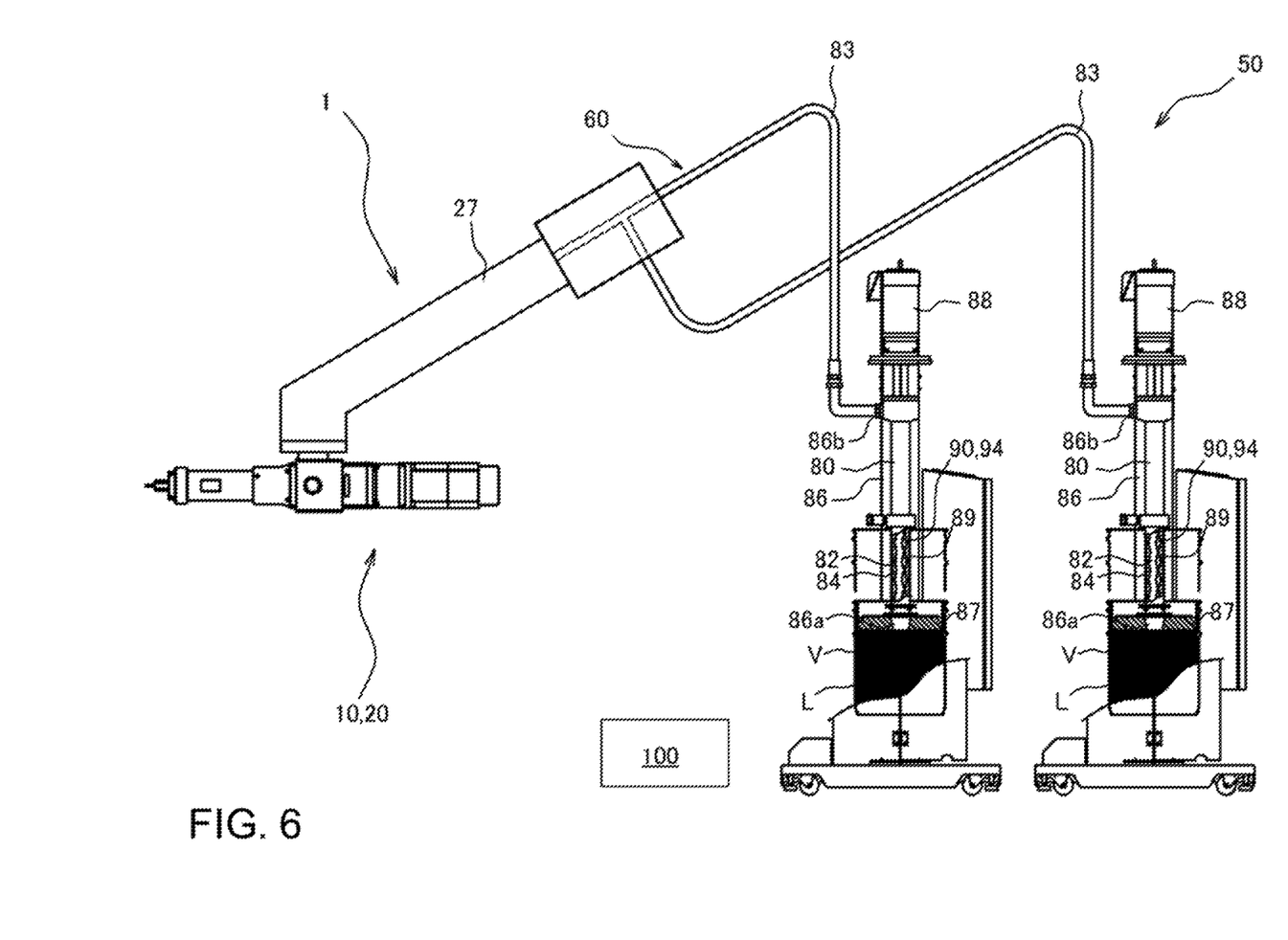
FIG. 6 is a device configuration view illustrating a device configuration of a molding system and a fluid feeding system according to a modification.

The discharging device 120 provided to the molding device 110 has a similar structure to the pump 80 described above. Although detailed description of the molding device 110 is omitted, it has the uniaxial eccentric screw pump mechanism provided with a rotor (not illustrated) and a stator (not illustrated). The molding device 110 is formed with, as a component corresponding to the introduction chamber 28 of the molding device 10, an unfilled space (cavity) for fluid conveyance formed between the rotor and the stator so that the fluid can be introduced and discharged based on a pressure difference.

As described above, since the discharging device 120 provided with the uniaxial eccentric screw pump mechanism is used in the molding device 110, a discharge performance of the fluid can be improved and a molding accuracy can further be improved. Moreover, the molding device 110 can also exhibit a function as the valve to block a flow of the fluid which flows toward the molding device 110 via the feed channel 60, by stopping a relative rotation of the rotor and the stator. Thus, it is not necessary to provide the valve 70 etc. and, thus, the device configuration can further be simplified.

INDUSTRIAL APPLICABILITY

The fluid feeding system of the present invention can suitably be used in all applications in which fluid is fed to a discharging device formed with an introduction chamber of which a volume increases and decreases in each stage of discharging and feeding of the fluid. Moreover, the molding system of the present invention can suitably be used as an injection molding device etc. which discharges fluid to mold.

DESCRIPTION OF REFERENCE NUMERALS

1 Molding System
10 Molding Device
20 Discharging Device
24 Fluid Drawing-In Mechanism
28 Introduction Chamber
50 Fluid Feeding System
60 Feed Channel
62 First Branched Channel
64 Second Branched Channel
70 Valve
80 Pump
100 Control Device
P1 Pressure
P2 Pressure

What is claimed is:

1. A fluid feeding system for feeding fluid to a discharging device that is capable of introducing and discharging the fluid based on a pressure difference, comprising:
   a feed channel connected to the discharging device;
   a pump connected to the feed channel;
   a valve for blocking a flow of the fluid that flows toward the discharging device via the feed channel with the valve provided on the feed channel between the pump and the discharging device;
   a control device for determining a pressure state on the pump side and performs an opening-and-closing control of the valve based on a determination result; and
   a first pressure sensor and a second pressure sensor respectively provided on the pump side and the discharging device side via the feed channel,
   the first pressure sensor is provided between the pump and the valve in the feed channel,
   the second pressure sensor is provided between the valve and the discharging device in the feed channel,
   wherein the control device is configured to perform the opening-and-closing control in which the valve is made into an open state when the control device determines that one or both of a pressure P1 of the first pressure sensor on the pump side with respect to the valve and a pressure P2 of the second pressure sensor on the discharging device side with respect to the valve reaches a pressure state exceeding a given pressure;
   the pump is switchable of a direction of the fluid flow between a positive direction and a negative direction, and
   the control device carries out a final stage control in which the pump is operated so the direction of the fluid flow is switched to a reversed direction from a direction when the fluid is discharged, in a feed final stage where the introduction of the fluid to the discharging device is terminated,
   wherein the discharging device includes:
   an introduction chamber into which the fluid is introducible; and
   an actuator driver and a piston for producing the pressure difference by changing a volume of the introduction chamber to draw the fluid into the introduction chamber,
   wherein the fluid introduced into the introduction chamber is dischargeable to outside by decreasing the volume of the introduction chamber, and the fluid is introducible into the introduction chamber by increasing the volume of the introduction chamber after the discharge of the fluid.

2. The fluid feeding system of claim 1, wherein the final stage control is terminated within a range where the pressure on the pump side is above the pressure on the discharging device side.

3. The fluid feeding system of claim 1, wherein the feed channel is branched to a plurality of branched channels upstream of the valve in a feeding direction of the fluid to the discharging device, and
   wherein the pump is provided to each of the branched channels.

4. The fluid feeding system of claim 3, wherein the fluid fed via one or more of the plurality of branched channels and the fluid fed via other one or more branched channels have properties that change into a different property by mixing the fluids.

5. The fluid feeding system of claim 1, wherein the pressure state on the pump side is determined by a pressure sensor.

6. The fluid feeding system of claim 1, wherein the control device carries out a feedback control of an output of the pump so that the pressure on the discharging device side falls within a pressure range defined by a given maximum pressure and minimum pressure, after the valve is made into the open state and the introduction of the fluid to the discharging device is started,
   wherein if the pressure shows a tendency to rise, the control device carries out an output control of the pump when the pressure exceeds the maximum pressure, and
   wherein if the pressure shows a tendency to drop, the control device carries out the output control of the pump when the pressure becomes below the minimum pressure, or when the pressure is changed to the tendency to rise from the tendency to drop.

* * * * *